US005535404A

United States Patent [19]

Tsubota

[11] Patent Number: 5,535,404
[45] Date of Patent: Jul. 9, 1996

[54] MICROPROCESSOR STATUS REGISTER HAVING PLURAL CONTROL INFORMATION REGISTERS EACH SET AND CLEARED BY ON AND OFF DECODERS RECEIVING THE SAME CONTROL DATA WORD

[75] Inventor: Masashi Tsubota, Tokyo, Japan

[73] Assignee: NEC Corporation, Tokyo, Japan

[21] Appl. No.: 170,987

[22] Filed: Dec. 21, 1993

Related U.S. Application Data

[63] Continuation of Ser. No. 514,141, Apr. 25, 1990, abandoned.

[30] Foreign Application Priority Data

Apr. 25, 1989 [JP] Japan ................................ 1-106254

[51] Int. Cl.$^6$ ............................ G06F 1/06; G06F 1/24; G06F 9/308
[52] U.S. Cl. ................... 395/800; 364/DIG. 1; 364/DIG. 2; 395/550; 395/750; 395/182.22; 327/210; 327/291
[58] Field of Search ..................... 395/800, 250, 395/275, 550, 500, 575, 375, 182.22, 775, 750; 364/DIG. 1, DIG. 2, 488, 489, 167.01, 560, 489, 707; 326/40, 105, 96; 340/825.58, 825.68, 825.75, 825.87, 825.88, 825.89, 825.14, 310.01, 825.04; 371/22.3, 20.1; 370/94.1; 327/210, 291

[56] References Cited

U.S. PATENT DOCUMENTS

| | | | |
|---|---|---|---|
| Re. 32,900 | 4/1989 | Orsic | 370/54 |
| 3,911,400 | 10/1975 | Levy et al. | 395/325 |
| 4,064,487 | 12/1977 | Russell et al. | 340/825.58 |
| 4,358,825 | 11/1982 | Kyu et al. | 395/325 |
| 4,430,702 | 2/1984 | Schiebe et al. | 395/325 |
| 4,541,048 | 7/1985 | Propster et al. | 395/725 |
| 4,631,677 | 12/1986 | Zulian et al. | 395/325 |
| 4,833,600 | 5/1989 | Brodsky | 395/325 |

OTHER PUBLICATIONS

"Structured Computer Organization", pp. 58–112, Chapter 3, 1984 by Prentice Hall, N.J., Andrew Tanenbaum.
Tanenbaum, Adrew, S., Structured Computer Org. pp. 58–97, Prentice Hall 1984 N.J.
Gschwind et al.; Design of Digital Computers; pp. 123–141. 1975; NY.

*Primary Examiner*—Daniel H. Pan
*Attorney, Agent, or Firm*—Foley & Lardner

[57] ABSTRACT

A status register apparatus includes a control information register for holding one item of control information. An ON decoder is connected to receive a control word composed of a plurality of bits and for generating a set signal to the control information register when the ON decoder detects a first bit pattern for setting the control information register into an on condition. An OFF decoder is connected to receive the control word and for generating a clear signal to the control information register when the OFF decoder detects a second bit pattern for setting the control information register into an off condition. When the first bit pattern is detected by the ON decoder, the control information register is set to the on condition in response to the set signal. When the second bit pattern is detected by the OFF decoder, the control information register is set to the off condition in response to the clear signal. When neither the first bit pattern nor the second bit pattern is detected, the control information register maintains its preceding condition.

8 Claims, 5 Drawing Sheets

MICROPROCESSOR STATUS REGISTER HAVING PLURAL CONTROL INFORMATION REGISTERS EACH SET AND CLEARED BY ON AND OFF DECODERS RECEIVING THE SAME CONTROL DATA WORD

This application is a continuation of application Ser. No. 07/514,141, filed Apr. 25, 1990, now abandoned.

BACKGROUND OF THE INVENTION

1. Field of the Invention

The present invention relates to a data processor, and more specifically to a status register apparatus for use in a microprocessor.

2. Description of Related Art

In general, a status register apparatus provided in a microprocessor includes a plurality of control information registers, each being adapted to hold one item of control information inherent to the control information register.

Conventionally, a control word of a microprocessor which is inherent data for setting the status registers is constituted in such a manner that each bit of the control word is assigned to one corresponding control information register. Therefore, it is possible to simultaneously set a plurality of items of control information by means of the control word.

Referring to FIG. 1, there is shown a typical relation between a conventional control word and a virtual mode flag and a cache enable flag, these flags being typical control information registers in the status register apparatus of the microprocessor. The virtual mode flag is for switching between a real address mode of the microprocessor and a virtual address mode for a virtual memory function. This virtual mode flag is assigned to a "No.3" bit of the control word. The cache enable flag is for controlling whether or not an internal cache memory of the microprocessor is used. This cache enable flag is assigned to a "No.2" bit of the control word. In the example shown, since the control word is composed of 8 bits, the control word can be allocated to eight control information registers at maximum. When an operator of the microprocessor rewrites the cache enable flag, the control word is read out from the status register apparatus, and the "No. 2" bit of the read-out control word is modified by means of, for example, an logical product operation, and thereafter, the modified control word is rewritten into the status register apparatus by activating a write signal for the status register apparatus. As a result, the cache enable flag is rewritten.

Thus, the control information register for the cache enable flag can be written by setting a desired value to a corresponding "No.2" bit of the control word, and by writing the corresponding "No.2" bit of the control word having the desired value into the control information register when the write signal is active. Similarly, the control information register for the virtual mode flag can be written by setting a desired value to a corresponding "No.3" bit of the control word, and by writing the corresponding "No.3" bit of the control word having the desired value into the control information register when the write signal is active. In other words, when the write signal is active, all bits or allocated bits of the control words are written into corresponding control information registers. On the other hand, contents of the respective control information registers are maintained by maintaining the write signal in an inaction condition.

On the other hand, the status register apparatus of the conventional microprocessor has been mainly such that the respective control information registers hold control information of the system itself or are allocated to flags indicative of an operation condition of the microprocessor. Therefore, if the status register apparatus is erroneously set, there is a danger that it might cause the system to malfunction, or might damage the system. In the conventional status register apparatus there is a possibility that the status register apparatus might be erroneously set. For example, although only the cache enable flag should be rewritten, if not only the "No.2" bit of the control word corresponding to the cache enable flag but also the "No.3" bit of the control word corresponding to the virtual mode flag were modified, when the write signal becomes active and the cache enable flag is properly rewritten the virtual mode flag might be erroneously rewritten, with the result that the system would cause a "program run away".

SUMMARY OF THE INVENTION

Accordingly, it is an object of the present invention to provide a status register apparatus which has overcome the above mentioned defect of the conventional one.

Another object of the present invention is to provide a status register apparatus which can prevent a control information register from being erroneously rewritten in place of another control information register.

The above and other objects of the present invention are achieved in accordance with the present invention by a status register apparatus including a control information register for holding one item of control information, a first decoder connected for receive register control data composed of a plurality of bits and for generating a first signal to the control information register when the first decoder detects a first bit pattern for setting the control information register into an on condition, and a second decoder connected to receive the register control data and for generating a second signal for the control information register when the second decoder detects a second bit pattern for setting the control information register into an off condition, so that when the first bit pattern is detected by the first decoder, the control information register is set to the on condition in response to the first signal, and when the second bit pattern is detected by the second decoder, the control information register is set to the off condition in response to the second signal, and when neither the first bit pattern nor the second bit pattern is detected, the control information register maintains its preceding condition.

According to another aspect of the present invention, there is provided a status register apparatus including a plurality of control information registers each for holding one item of control information, a plurality of ON decoders each provided for a corresponding one of the control information registers and to receive register control data composed of a plurality of bits for generating a set signal for the corresponding control information register when the ON decoder detects a bit pattern for setting the corresponding control information register into an on condition, and a plurality of OFF decoders each provided for a corresponding one of the control information registers and to receive the same data as the register control data supplied to the ON decoder corresponding to the corresponding control information register, so as to generate a clear signal for the corresponding control information register when the OFF decoder detects another bit pattern for setting the corresponding control information register into an off condition, so that each of the control information registers is brought into the on condition when the corresponding ON decoder generates the set signal as the result of detection of the bit pattern for setting the control information register into the on condition, and into the off condition when the corresponding OFF decoder generates the clear signal as the result of detection of the bit pattern for setting the control information register into the off condition.

With the above mentioned arrangement, a bit pattern composed of a plurality of bits is assigned for one control information register, and is given in the form of register control data composed of a plurality of bits, which can be a control word, so that only one control information register is set to the on condition or the off condition at a time. This is completely different from the conventional status register apparatus of the microprocessor in which each bit of a control word is allocated to one corresponding item of control information, so that a plurality of items of control information can be simultaneously set.

The above and other objects, features and advantages of the present invention will be apparent from the following description of preferred embodiments of the invention with reference to the accompanying drawings.

DESCRIPTION OF THE PREFERRED EMBODIMENTS

Figure 1:
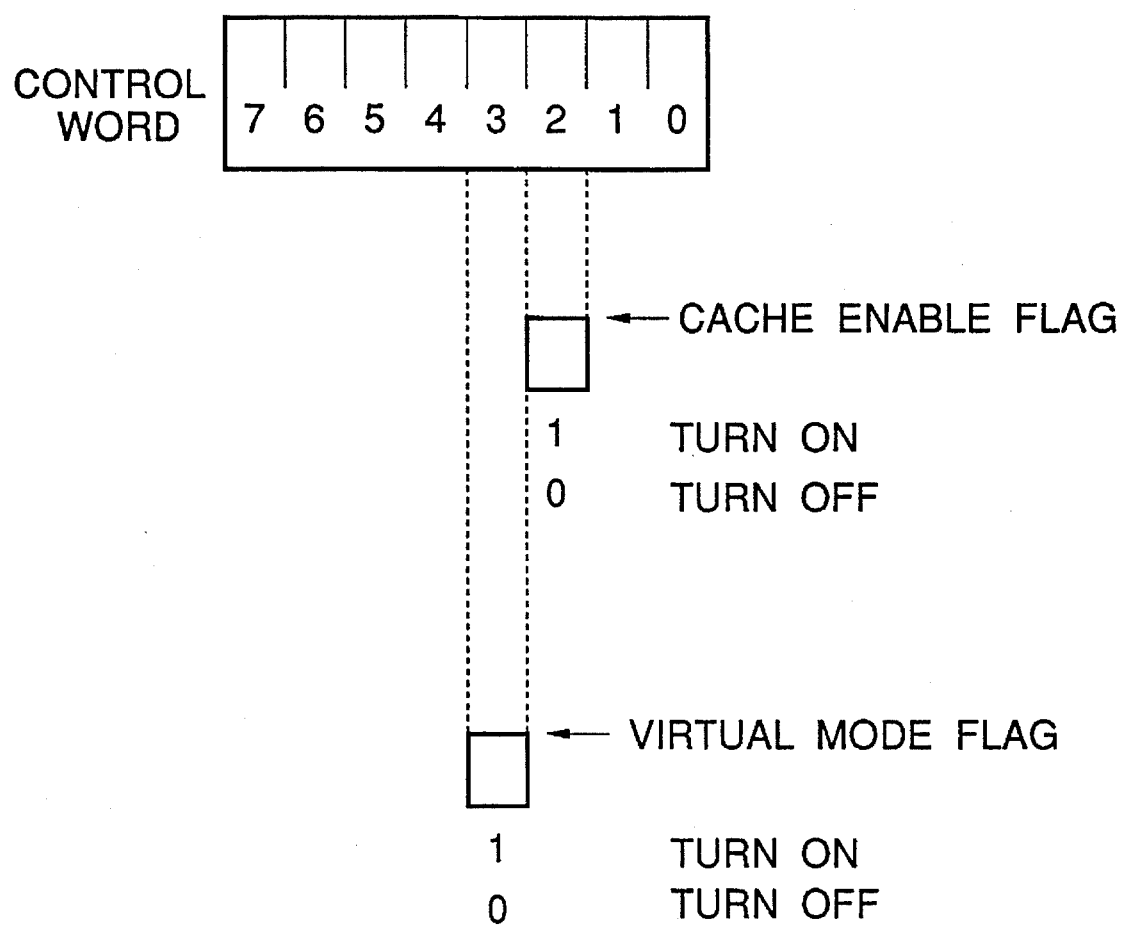
FIG. 1 illustrates items of control information allocated to a control word in the conventional system.
Figure 2:
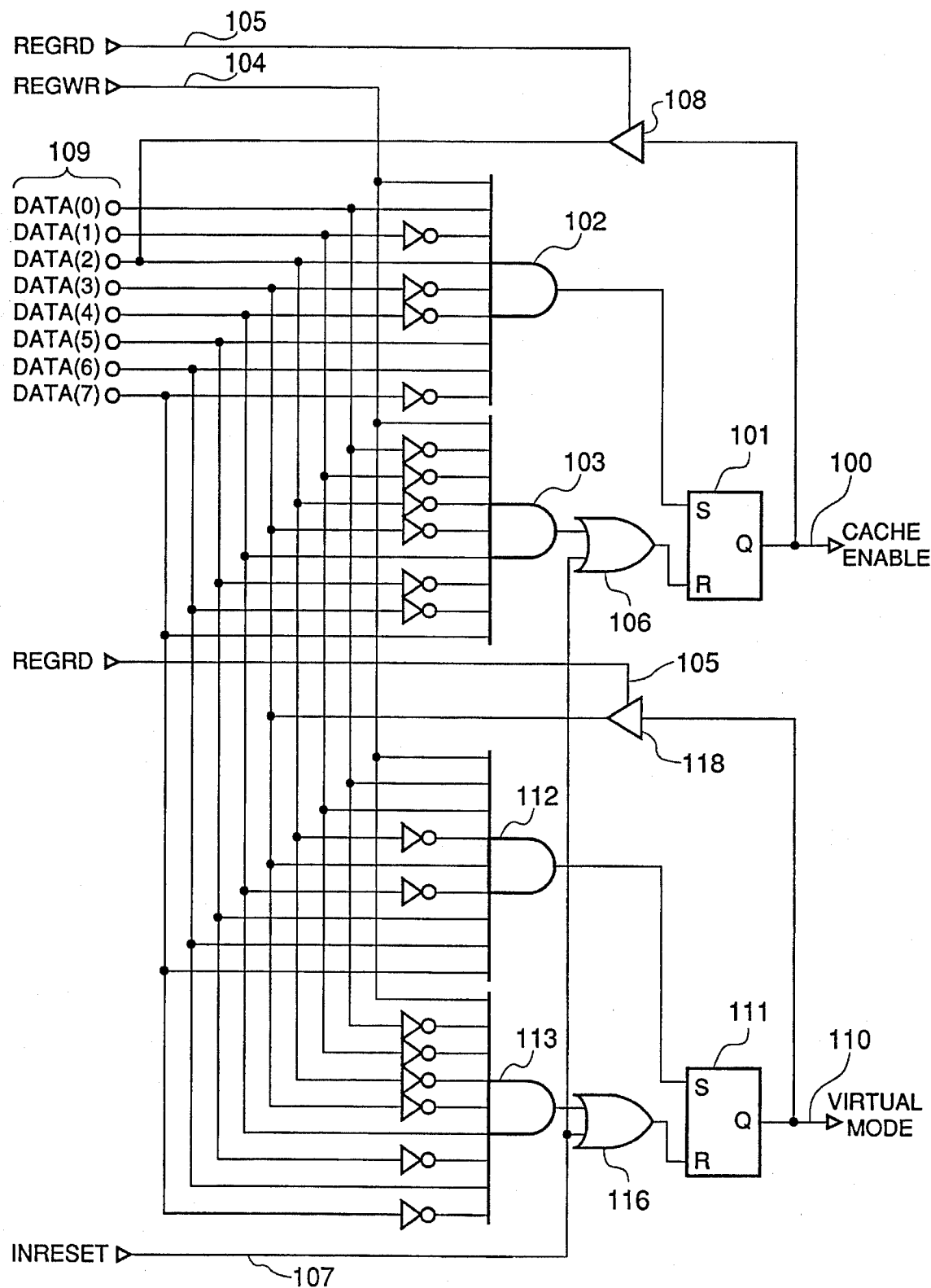
FIG. 2 is a block diagram of an embodiment of a status register apparatus in accordance with the present invention for a microcomputer.

Referring to FIG. 2, there is shown a block diagram of an embodiment of a status register apparatus in accordance with the present invention for a microcomputer. This embodiment of the status register apparatus includes one control information register, one ON decoder, one OFF decoder, one initializing circuit and one reading circuit, for each control information flag. A control information register for a cache enable flag is composed of a R-S flipflop 101, and a control information register for a virtual mode flag is composed of a R-S flipflop 111.

First, the cache enable flag will be explained. A Q output of the R-S flipflop 101 constitutes a cache enable signal 100. A set input S of the R-S flipflop 101 is connected to an output of an ON decoder 102, which receives, in parallel, a write signal REGWR 104 and all bits of a 8-bit control word through terminals 109 labeled with DATA(7) to DATA(0), respectively. This ON decoder is constructed to decode a bit pattern of "01100101" when the write signal REGWR is active. Therefore, the ON decoder 102 can be formed of one 9-input AND gate and four inverters connected as shown in FIG. 2. A reset input R of the R-S flipflop 101 is connected to receive an output of an OFF decoder 103, which receives, in parallel, the write signal REGWR 104 and all the bits of the 8-bit control word 109, similarly to the ON decoder 102. This OFF decoder is constructed to decode a bit pattern of "10010000" when the write signal REGWR is active. Therefore, the OFF decoder 103 can be formed of one 9-input AND gate and six inverters connected as shown in FIG. 2.

The initializing circuit for the cache enable flag is formed of an OR gate 106 having an output connected to the reset input R of the R-S flipflop 101 and a first input connected to an output of the OFF decoder 103 and a second input connected to receive a reset signal IRESET 107, so that an initial value of the R-S flipflop (control information register) 101 is brought to an OFF condition in response to the reset signal IRESET 107. The read circuit is composed of a tristate buffer 108 controlled by a read signal REGRD 105 and having an input connected to the Q output of the R-S flipflop 101 and an output connected to the "No. 2" bit terminal DATA(2) of the control word 109, so that the control information held in the control information register (R-S flipflop 101) is output or set through the tristate buffer 108 to the "No. 2" bit terminal DATA(2) of the control word 109 when the tristate butter 108 is activated by the read signal REGRD 105.

Now, the virtual mode flag will be explained. A Q output of the R-S flipflop 111 constitutes a virtual mode signal 110. A set input S of the R-S flipflop 111 is connected to an output of an ON decoder 112, which receives, in parallel, the write signal REGWR 104 and all the bits of the 8-bit control word 109, similarly to the ON decoder 101 for the cache enable flag. This ON decoder is constructed to decode a bit pattern of "11101011" when the write signal REGWR is active. Therefore, the ON decoder 112 can be formed of one 9-input AND gate and two inverters connected as shown in FIG. 2. A reset input R of the R-S flipflop 111 is connected to receive an output of an OFF decoder 113, which receives, in parallel, the write signal REGWR 104 and all the bits of the 8-bit control word 109, similarly to the ON decoder 112. This OFF decoder is constructed to decode a bit pattern of "01010000" when the write signal REGWR is active. Therefore, the OFF decoder 113 can be formed of one 9-input AND gate and six inverters connected as shown in FIG. 2.

The initializing circuit for the virtual mode flag is formed of an OR gate 116 having an output connected to the reset input R of the R-S flipflop 111 and a first input connected to an output of the OFF decoder 113 and a second input connected to receive the reset signal IRESET 107, so that an initial value of the R-S flipflop (control information register) 111 is brought to an OFF condition in response to the reset signal IRESET 107. The read circuit is composed of a tristate buffer 118 controlled by the read signal REGRD 105 and having an input connected to the Q output of the R-S flipflop 111 and an output connected to the "No. 3" bit terminal DATA(3) of the control word 109, so that the control information held in the control information register (R-S flipflop 111) is outputted through the tristate butter 118 to the "No. 3" bit terminal DATA(3) of the control word 109 when the tristate butter 118 is activated by the read signal REGRD 105.

Figure 3:
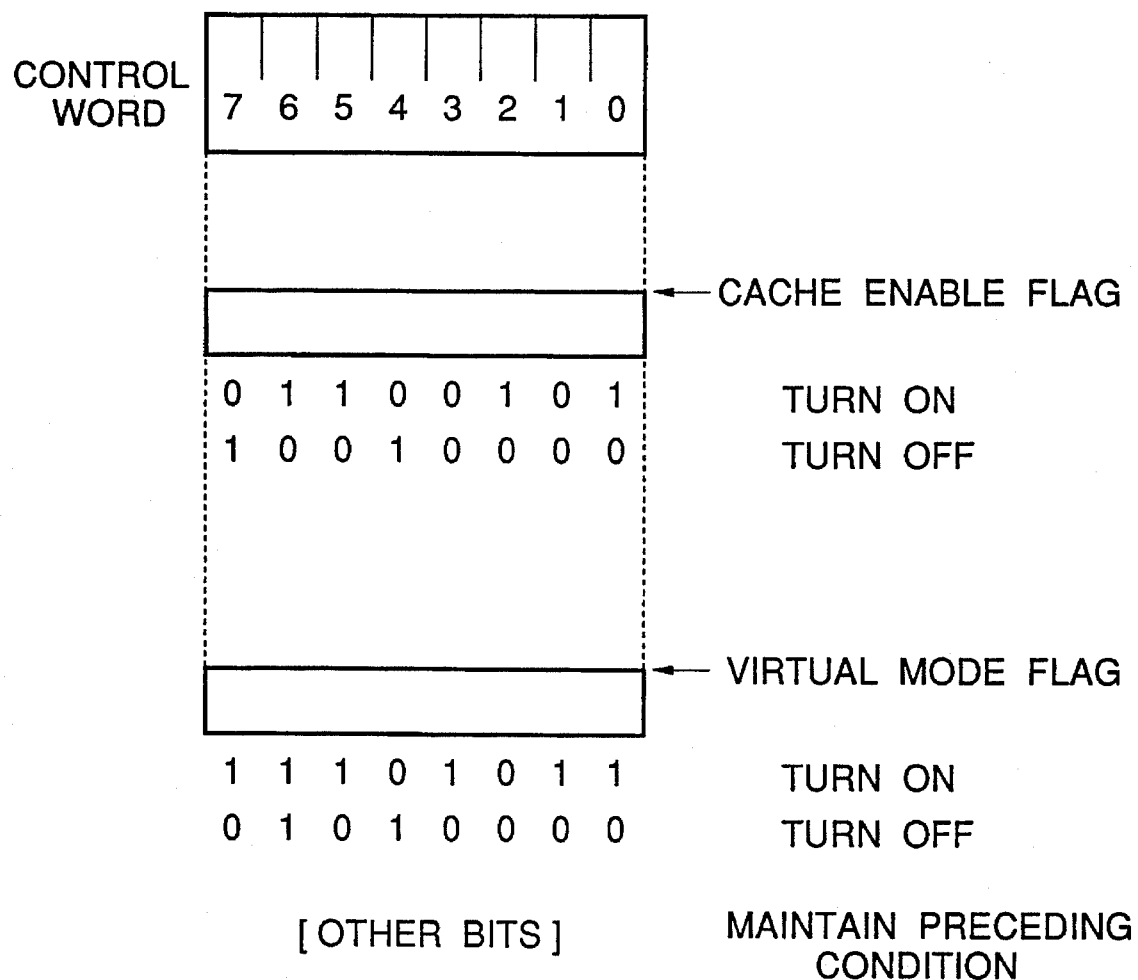
FIG. 3 illustrates items of control information allocated to a control word in the embodiment shown in FIG. 2.

Turning to FIG. 3, there is illustrated an allocation between items of control information and the control word in the embodiment of the status register apparatus shown in FIG. 2 for the microprocessor.

As seen from FIG. 3, the bit pattern for setting the control information register corresponding to the cache enable flag is such that when "01100101" is set to the control word, the control information register is set to the ON condition, and when "1001000" is set to the control word, the control information register is set to the OFF condition. The bit pattern for setting the control information register corresponding to the virtual mode flag is such that when "11101011" is set to the control word, the control information register is set to the ON condition, and when "01010000" is set to the control word, the control information register is set to the OFF condition. When the other bits patterns are set to the control word, the two control information registers are not changed so that their preceding conditions are maintained.

Now, a write operation for the control information register will be explained. The bit patterns of the control words are supplied through the terminals 109 DATA(7-0) to the ON decoder 102 and the OFF decoder 103 for the cache enable flag and to the ON decoder 112 and the OFF decoder 113 for the virtual mode flag. When the supplied bit pattern is "01100101", it is decoded by the ON decoder 102 for the cache enable flag, so that the R-S flipflop 101 (the control information register) is set in synchronism with the write signal REGWR 104. With this, the cache enable signal 101 is set to the ON condition. If the bit pattern is "00100101", it is decoded by none of the four decoders 102, 103, 112 and 113, and therefore, the conditions of the two control information registers are not changed, so that the cache enable flag and the virtual mode flag maintain their preceding condition.

Figure 4:
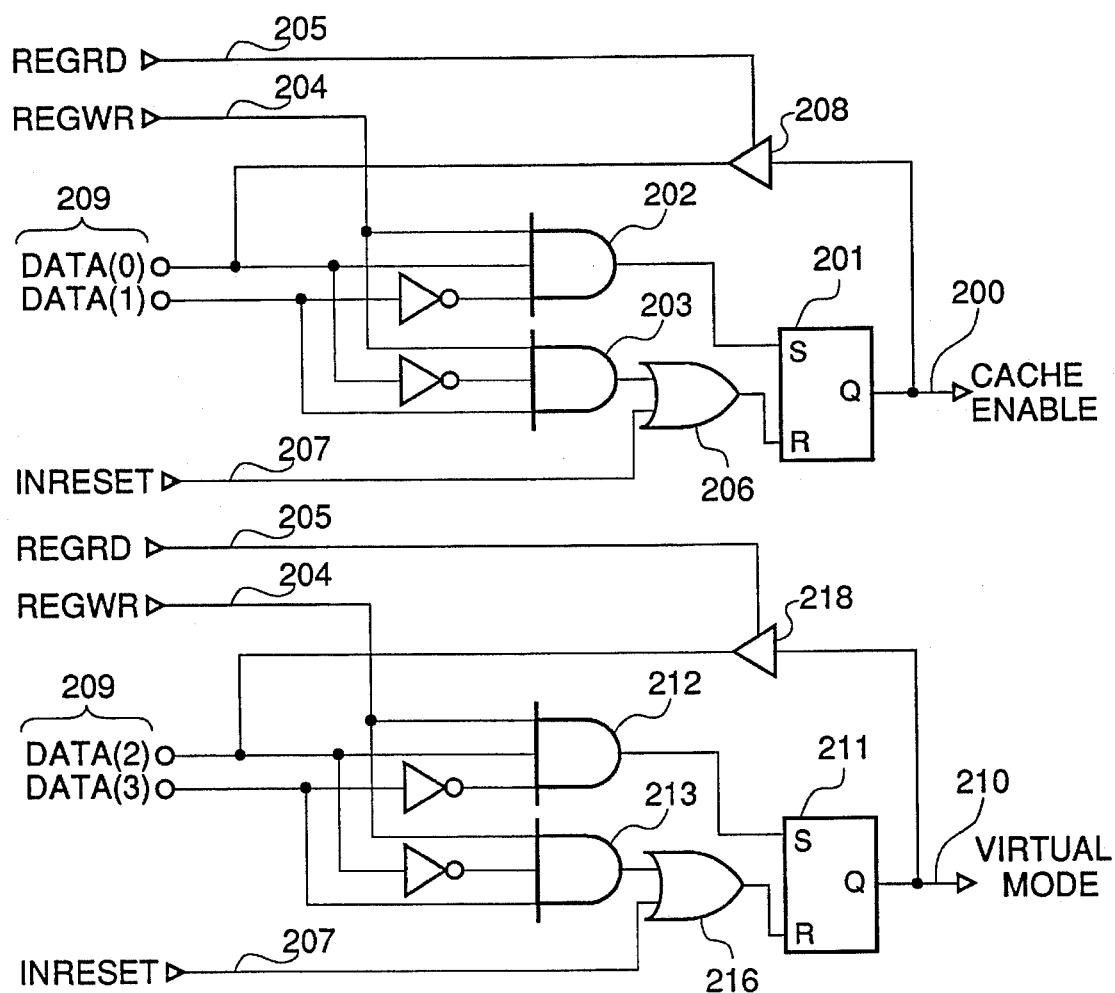
FIG. 4 is a block diagram of another embodiment of a status register apparatus in accordance with the present invention for a microcomputer.

Referring to FIG. 4, there is shown a block diagram of another embodiment of a status register apparatus in accordance with the present invention for a microcomputer. This second embodiment includes one control information register, one ON decoder, one OFF decoder, one initializing circuit and one reading circuit, for each control information flag. The first embodiment is such that all the four decoders receive the same bit pattern of 8 bits, but the second embodiment is such that for each control information flag, a bit pattern composed of two bits, which are selected from the control word, but which are different from those selected for other control information flags, is decoded. A control information register for a cache enable flag is composed of a R-S flipflop 201, and a control information register for a virtual mode flag is composed of a R-S flipflop 211.

First, the cache enable flag will be explained. A Q output of the R-S flipflop 201 constitutes a cache enable signal 200. A set input S of the R-S flipflop 201 is connected to an output of an ON decoder 202, which receives, in parallel, a write signal REGWR 204 and "No.1" and "No.0" bits of a 8-bit control word through terminals 209 labeled with DATA(1) and DATA(0), respectively. This ON decoder is constructed to decode a bit pattern of "01" on the terminals DATA(1) and DATA(0) when the write signal REGWR is active. A reset input R of the R-S flipflop 201 is connected to receive an output of an OFF decoder 203, which receives, in parallel, the write signal REGWR 204 and the same "No.1" and "No.0" bits of the 8-bit control word 209, similarly to the ON decoder 202. This OFF decoder is constructed to decode a bit pattern of "10" on the terminals DATA(1) and DATA(0) when the write signal REGWR is active. The initializing circuit for the cache enable flag is formed of an OR gate 206 having an output connected to the reset input R of the R-S flipflop 201 and a first input connected to an output of the OFF decoder 203 and a second input connected to receive a reset signal IRESET 207, so that an initial value of the R-S flipflop (control information register) 201 is brought to an OFF condition in response to the reset signal IRESET 207. The read circuit is composed of a tristate buffer 208 controlled by a read signal REGRD 205 and having an input connected to the Q output of the R-S flipflop 201 and an output connected to the "No. 0" bit terminal DATA(0) of the control word 209, so that the control information held in the control information register (R-S flipflop 201) is output or set through the tristate buffer to the the "No. 0" bit terminal DATA(0) of the control word 209.

Now, the virtual mode flag will be explained. A Q output of the R-S flipflop 211 constitutes a virtual mode signal 210. A set input S of the R-S flipflop 211 is connected to an output of an ON decoder 212, which receives, in parallel, the write signal REGWR 204 and "No.3" and "No.2" bits of the 8-bit control word through terminals 209 labeled with DATA(3) and DATA(2), respectively, which are different from the two bits inputted to the ON decoder 201 for the cache enable flag. This ON decoder is constructed to decode a bit pattern of "01" when the write signal REGWR is active. A reset input R of the R-S flipflop 211 is connected to receive an output of an OFF decoder 213, which receives, in parallel, the write signal REGWR 204 and the two bits DATA(3) and DATA(2) of the control word 209, similarly to the ON decoder 212. This OFF decoder is constructed to decode a bit pattern of "10" when the write signal REGWR is active. The initializing circuit for the virtual mode flag is formed of an OR gate 216 and the read circuit is composed of a tristate buffer 218, similarly to those for the cache enable flag. But, the tristate buffer 218 has an output connected to the "No. 2" bit terminal DATA(2) of the control word 209, so that the control information held in the R-S flipflop 211 is output through the tristate buffer to the "No. 2" bit terminal DATA(2) of the control word 209. Each of the decoders 202, 203, 212 having 213 can be composed of one 3-input AND gate and one inverter connected as shown in FIG. 4.

Figure 5:
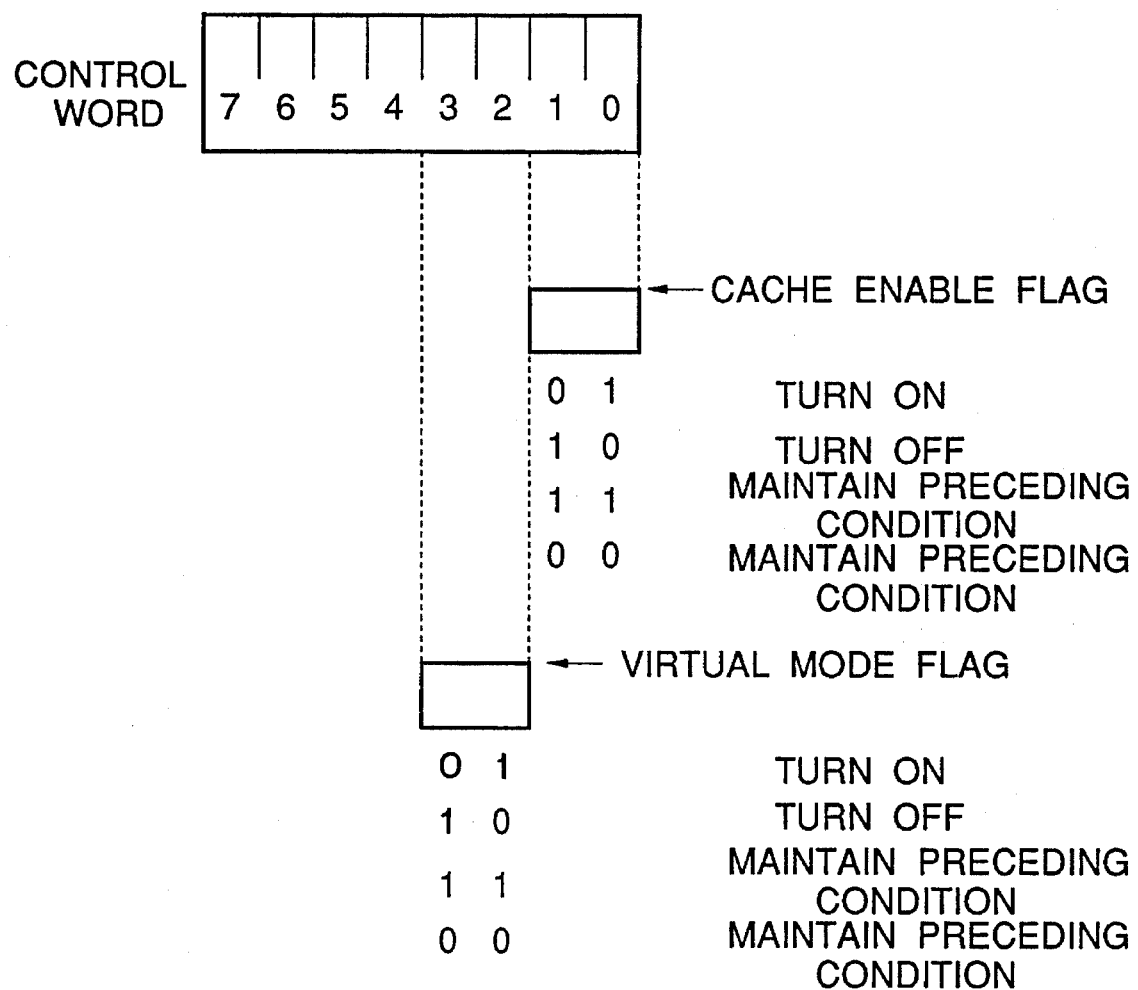
FIG. 5 illustrates items of control information allocated to a control word in the embodiment shown in FIG. 4.

Turning to FIG. 5, there is illustrated an allocation between items of control information and the control word in the embodiment of the status register apparatus shown in FIG. 4 for the microprocessor.

As seen from FIG. 5, the bit pattern for setting the control information register corresponding to the cache enable flag is such that when "XXXXXX01" is set to the control word, the control information register is set to the ON condition, and when "XXXXXX10" is set to the control word, the control information register is set to the OFF condition. The bit pattern for setting the control information register corresponding to the virtual mode flag is such that when "XXXX01XX" is set to the control word, the control information register is set to the ON condition, and when "XXXX10XX" is set to the control word, the control information register is set to the OFF condition. In addition, the bit pattern for writing both of the control information register of the cache enable flag and the control information register of the virtual mode flag is as follows: When "XXXX0101" is set to the control word, both of the control information registers are set to the ON condition, and when "XXXX1010" is set to the control word, both of the control information registers are set to the OFF condition. When "XXXX0110" is set to the control word, the control information register of the cache enable flag is set to the OFF condition, and the control information register of the virtual mode flag is set to the ON condition. If "XXXX1001" is set to the control word, the control information register of the cache enable flag is set to the ON condition, and the control information register of the virtual mode flag is set to the OFF condition. When the other bits patterns are set to the control word, the two control information registers are not changed so that the preceding conditions are maintained.

In the first embodiment shown in FIG. 2, all bits of the control word is utilized in order for one control information register to be set to the ON or OFF condition on the basis of the bit pattern given to the control word. Therefore, the setting of the control word at one time can rewrite only one control information register. In the second embodiment, on the other hand, the control word is divided into a plurality of units each composed of two bits, so that a plurality of control information registers can be simultaneously set to the ON or OFF condition.

Now, a write operation for the control information register in the second embodiment shown in FIG. 4 will be explained. The bit pattern of the control words are supplied through the terminals 209 DATA(7-0) as they are, and the bits DATA(1-0) are input to the ON decoder 202 and the OFF decoder 203 for the cache enable flag, and the bits DATA(3-2) are input to the ON decoder 212 and the OFF decoder 213 for the virtual mode flag. When the supplied bit pattern is "XXXX0101", it is decoded by the ON decoder 202 for the cache enable flag and the ON decoder 212 for the virtual mode flag, so that the two R-S flipflops 201 and 211 (the control information registers) are set in synchronism with the write signal REGWR 204. With this, the cache enable signal 200 and the virtual mode signal 210 are set to the ON condition. If the bit pattern is "XXXX0000", it is decoded by none of the four decoders 202, 203, 212 and 213, and therefore, the conditions of the two control information registers are not changed, so that the cache enable flag and the virtual mode flag maintain their preceding condition.

As seen from the above description of the embodiments, the status register apparatus in accordance with the present invention is such that when one control information register is rewritten, the rewriting will not influence the other control information registers. Therefore, it is not necessary to read out the control word, to modify a bit of the control word corresponding to a control information register to be rewritten, and to return the control word having the modified bit. In other words, the present invention is advantageous in that a control information register to be rewritten can be easily set to the ON or OFF condition by giving a predetermined bit pattern composed of a plurality of bits to the control word. In some cases, however, the number of the control information registers allowed to be allocated to the control word would become smaller than that of the conventional apparatus. This is not a problem. In this connection, it should be noted that it is the conventional practice that all the bits of the control word are not allocated to various control information registers. Items of control information having a particularly significant meaning are a limited number, and, some systems have a plurality of different control words in accordance with the degree of significance in control information and the function of the control information.

In addition, if inherent patterns are given to a bit pattern for the control word, it is possible to make control information not open to users.

The invention has thus been shown and described with reference to the specific embodiments. However, it should be noted that the present invention is in no way limited to the details of the illustrated structures but changes and modifications may be made within the scope of the appended claims.

I claim:

1. A status register apparatus in a microprocessor for holding a control word constituting a plurality of bits, comprising:

a control information register for holding one of said bits of said control word;

a first decoder connected to receive said control word for generating a first signal to said control information register when said first decoder detects a first bit pattern in said control word for setting said control information register into an ON condition; and a second decoder connected to receive said control word for generating a second signal to said control information register when said second decoder detects a second bit pattern different from said first bit pattern in said control word for setting said control information register into an OFF condition;

wherein when said first bit pattern is detected by said first decoder, said control information register is set to said ON condition in response to said first signal, wherein when said second bit pattern is detected by said second decoder, said control information register is set to said OFF condition in response to said second signal, wherein when neither said first bit pattern nor said second bit pattern is detected, said control information register maintains its preceding condition, and wherein said first and second decoders are connected to receive a write signal so that each of said first and second decoders is activated only when said write signal is active.

2. A status register apparatus in a microprocessor for holding a control word constituting a plurality of bits, comprising:

a plurality of control information registers;

a plurality of ON decoders; and a plurality of respective complementary OFF decoders;

each ON decoder and complementary OFF decoder pair of said ON and OFF decoders being connected to corresponding one of said control information registers;

each said control information register holding one of said bits in said control word;

said each ON decoder
receiving said control word,
detecting whether said control word contains a first bit pattern for setting said corresponding control information register into an ON condition, and
generating and supplying a set signal to said corresponding control information register for setting said corresponding control information register into said ON condition when said first bit pattern is detected;

said each OFF decoder
receiving said control word received by said ON decoder,
detecting whether said control word contains a second bit pattern different from said first bit pattern of said control word for setting said corresponding control information register into an OFF condition, and generating a clear signal to said corresponding control information register for setting said corresponding control information register into said OFF condition when said second bit pattern is detected, and wherein each of said decoders are connected to receive a write signal so that each of said decoders is activated only when said write signal is active.

3. A status register apparatus claimed in claim 2 wherein all of said ON decoders and all of said OFF decoders are connected to receive all said bits of said control word, each of said ON decoders decoding a predetermined bit pattern which is composed of all said bits of said control word and which is arranged to indicate a setting of only said corresponding control information register into said ON condition, and each of said OFF decoders decoding another predetermined bit pattern which is composed of all said bits of said control word and which is arranged to indicate a setting of only said corresponding control information register into said OFF condition.

4. A status register claimed in claim 3 wherein said corresponding control information register is formed of an R-S flipflop having a set input connected to said each ON decoder, a reset input connected to said each OFF decoder, and a Q output outputting said control information.

5. A status register apparatus claimed in claim 4 wherein said reset input of said R-S flipflop is connected to an output of an OR gate having a first input connected to an output of said each OFF decoder and a second input connected to a receive a reset signal.

6. A status register apparatus claimed in claim 2 wherein said each ON decoder and said each OFF decoder are connected to receive at least two selected bits selected from all said bits of said control word, different from bits selected for other of said control information registers than said corresponding control information register, said each ON decoder decoding a predetermined bit pattern which is composed of said at least two selected bits and which is arranged to indicate a setting of only said corresponding control information register into said ON condition, and said each OFF decoder decoding another predetermined bit pattern which is composed of said at least two selected bits and which is arranged to indicate a setting of only said corresponding control information register into the said OFF condition.

7. A status register apparatus claimed in claim 6 wherein each of said control information registers is formed of an R-S flipflop having a set input connected to a corresponding said each ON decoder, a reset input connected to a corresponding said each OFF decoder, and a Q output providing said control information.

8. A status register apparatus claimed in claim 7 wherein said reset input of each said R-S flipflop is connected to an output of a corresponding OR gate having a first input connected to an output of a corresponding said each OFF decoder and a second input connected to receive a reset signal.

* * * * *